Oct. 26, 1965 G. S. BRAZNELL ETAL 3,213,788

MADE READY RUBBER PRINTING PLATES

Original Filed March 19, 1962

George Stuart Braznell,
Ralph E. McIlvaney,
Inventors,

Koenig, Pope, Senniger and Powers,
Attorneys.

United States Patent Office 3,213,788
Patented Oct. 26, 1965

3,213,788

MADE READY RUBBER PRINTING PLATES

George Stuart Braznell, Frontenac, and Ralph E. McIlvaney, St. Louis County, Mo., assignors to Braco Engraving Company, St. Louis, Mo., a corporation of Missouri Original application Mar. 19, 1962, Ser. No. 180,472, now Patent No. 3,103,168, dated Sept. 9, 1963. Divided and this application May 16, 1963, Ser. No. 280,854
2 Claims. (Cl. 101—379)

This invention relates to rubber printing plates, and more particularly to what may be referred to as a made-ready rubber printing plate.

This application is a division of our copending application Serial No. 180,472, filed March 19, 1962, and now U.S. Patent 3,103,168, issued September 9, 1963, entitled Printing Plates.

It will be understood that a rubber printing plate essentially comprises a rubber plate having on one face thereof a pattern in relief of the matter which is to be printed by means of the plate. When a pattern includes both large printing areas and small printing areas (such as fine lines or dots, for example), it is usually necessary in order to obtain a proper impression in the printing operation that provision be made for applying less pressure on the small areas than the large areas, otherwise, if sufficient pressure is applied for proper impression of the large areas, the small areas will be undesirably distorted. Heretofore various expedients have been used for making ready to provide such differentiation in pressure, but these have usually involved operations subsequent to formation of the rubber printing plate, and have involved procedures making accurately controlled differentiation in amount and location of pressure difficult to obtain. Accordingly, among the several objects of this invention may be noted the provision of rubber printing plates which are made ready (i.e., formed so as to provide for pressure differentiation between large and small printing areas) during the production of the plates; and the provision of such plates which are economical to make and which provide accurate, built-in make-ready control. Other objects and features will be in part apparent and in part pointed out hereinafter.

The invention accordingly comprises the construction hereinafter described, the scope of the invention being indicated in the following claims.

In the accompanying drawings, in which one of various possible embodiments of the invention is illustrated, FIG. 1 is a plan of a so-called master metal engraving;

Corresponding reference characters indicate corresponding parts throughout the several views of the drawings.

Figure 1:
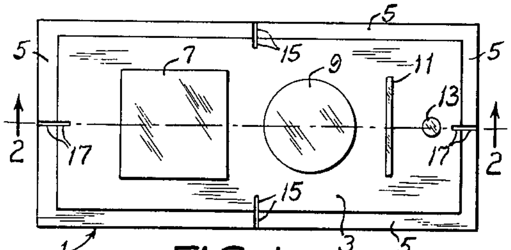
Figure 2:
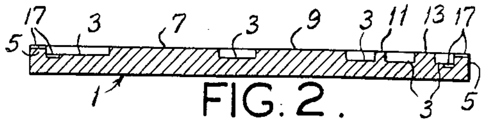
FIG. 2 is a section on line 2—2 of FIG. 1.

Referring to FIGS. 1 and 2 of the drawings, there is indicated at 1 what is referred to as a master engraving. As shown, this consists of a rectangular metal plate, for example, which has one face routed out as indicated at 3 to provide a desired printing pattern in relief, and a peripheral retaining wall 5 all around the plate. For purposes of simplified illustration, the printing pattern is shown as comprising two relatively large printing areas, a square area 7 and a circular area 9, and two relatively small printing areas, a fine-line area 11 and a dot 13. This is illustrative of conventional printing patterns which will include designs, trademarks, etc. The master engraving 1 is made in well-known conventional manner. The routing at 3 may be uniform in depth throughout, corresponding to the thickness in relief desired for the printing areas on the printing face of the rubber printing plate to be made. The master engraving 1 is also shown as formed with grooves as indicated at 15 and 17 for forming centering lines **15*a* and 17*a* (see FIGS. 4 and 5) in a matrix 19** (see FIGS. 4 and 5) to be made using the master engraving.

Figure 3:
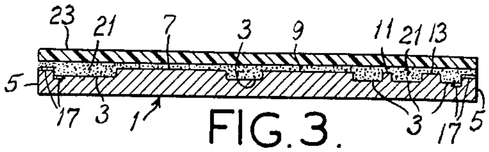
FIG. 3 is a view similar to FIG. 2 showing how a so-called matrix is made using the master engraving.
Figure 4:
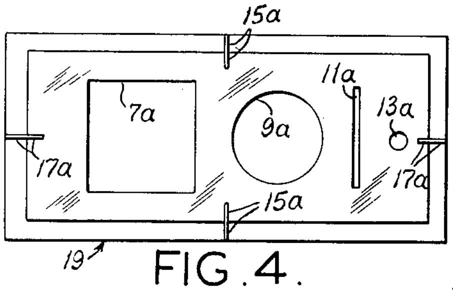
FIG. 4 is a plan of the matrix.
Figure 5:
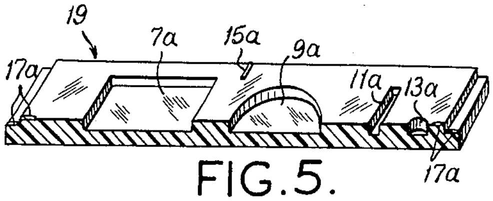
FIG. 5 is a half-section in perspective of the FIG. 4 matrix.

As shown in FIG. 3, the matrix is made using master engraving 1 in conventional manner by packing a thermosetting resin powder as indicated at 21 into the routed cavity 3 in the master engraving, and covering the faces of peripheral wall 5 and of areas 7, 9, 11 and 13 with this powder to a predetermined depth. The powder may be a phenol-formaldehyde resin powder such as sold under the trade designation "Bakelite" conventionally used for making such matrices. A plate 23 of thermosetting resin is applied over the powder. This plate may be a plate of phenol-formaldehyde resin such as sold under the trade designation "Bakelite" conventionally used for making such matrices. It will be understood that a parting compound will usually be applied to the master engraving to enable the matrix to be stripped from the engraving. Heat and pressure are applied to set and cure the resin powder and bond it to plate 23, thereby to form a matrix 19 having impressions in reverse of relief of the printing areas 7, 9, 11 and 13 of the master engraving. Referring to FIGS. 4 and 5, the impressions or cavities in the matrix 19 are respectively designated **7*a*, 9*a*, 11*a* and 13*a*. By reason of the provision of grooves 15 and 17 in the master engraving, centering lines 15*a* and 17*a* are formed as ridges on the matrix 19. FIGS. 4 and 5 show the matrix 19 stripped from the master engraving 1**.

Figure 6:
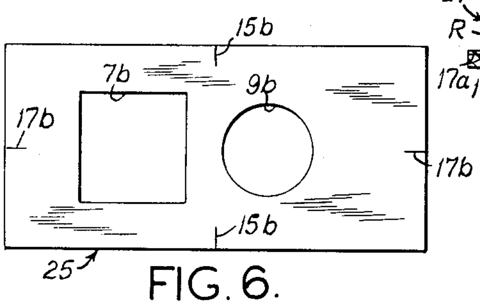
FIG. 6 is a view of a so-called stencil sheet used in making a plate.

As shown in FIG. 6, a so-called stencil sheet 25 is prepared having openings **7*b* and 9*b* corresponding in outline to the large areas 7 and 9 of the master engraving 1 and to the large areas 7*a* and 9*a* of the matrix 19, but without any openings corresponding to small areas 11 and 13. This sheet may be made of paper, sheet metal, or any other suitable material, and may be easily and accurately prepared simply by taking an ink impression (a proof) on the stencil sheet off the master engraving 1, then cutting out the areas printed on the sheet by contact with ink on areas 7 and 9 of the master engraving. Centering lines 15*b* and 17*b* are marked on the stencil sheet, being accurately located thereon relative to openings 7*b* and 9*b* from grooves 15 and 17** of the master engraving.

Figure 7:
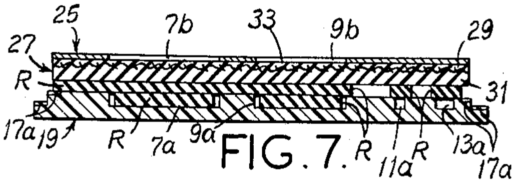
FIG. 7 is a section showing certain initial steps in the formation of a rubber printing plate of this invention, using the matrix of FIGS. 4 and 5 and the stencil sheet of FIG. 6.

As shown in FIG. 7, strips of unvulcanized rubber R are placed in the cavities **7*a* and 9*a* of the matrix, and over these cavities and other portions of the matrix. Strips of unvulcanized rubber may also be placed over cavities 11*a* and 13*a*. A backing plate 27 is applied over rubber R on the matrix. This backing plate 27, as appears in FIG. 7, may consist of a piece of fabric 29 having layers 31 and 33 of unvulcanized rubber on both faces thereof. Layer 31 is shown as thicker than layer 33, and layer 31 is applied face down over rubber R on the matrix. It will be understood that a suitable parting material is applied to the matrix prior to application of rubber R and the backing plate 27. The rubber used at R and in plate 27 may have a durometer in the range from 20–80, for example. Also as shown in FIG. 7, stencil sheet 25 is applied over the backing plate 27, and is centered by registering lines 15***b* and 17*b* on the stencil sheet with lines 15*a* and 17*a* on the matrix so that openings 7*b* and 9*b* in the stencil sheet register at least approximately (if not perfectly) with cavities 7*a* and 9*a* in the matrix.

Figure 9:
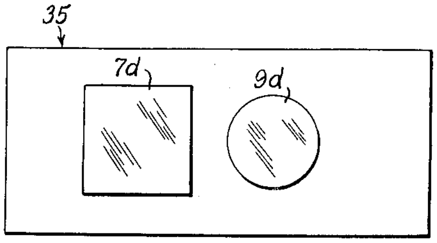
FIG. 9 is a view of the other face (or back face) of the completed rubber printing plate; and, FIG. 10 is a half-section in perspective of the rubber printing plate of FIGS. 8 and 9.
Figure 8:
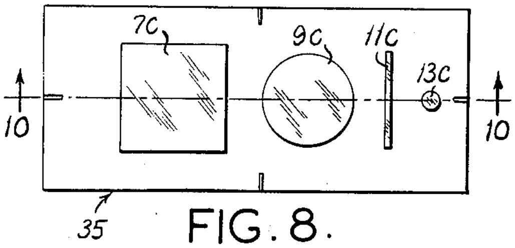
FIG. 8 is a view of the printing face of the completed rubber printing plate.
Figure 10:
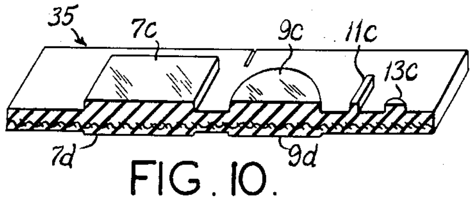

Then, the assembly of the matrix 19, rubber R, backing plate 27 and stencil sheet 25 is placed in a vulcanizing press, and heat and pressure are applied to cause filling of the cavities 7*a*, 9*a*, 11*a* and 13*a* in the matrix with rubber (from strips R, possibly also some rubber from layer 31 of the backing plate), also to cause filling of the openings 7*b* and 9*b* of the stencil sheet with rubber from layer 33 of the backing plate, bonding of the rubber in the cavities of the matrix with the backing plate, and vulcanization of the rubber. It will be understood that the pressure causes squeeze-out of rubber from layer 33 into openings 7*b* and 9*b* of the stencil sheet. This results in formation of the rubber printing plate 35 shown stripped from the matrix in FIGS. 8–10, and with stencil sheet 25 removed, having the printing pattern comprising printing areas 7*c*, 9*c*, 11*c* and 13*c* (corresponding to areas 7, 9, 11 and 13 of the master engraving) on its printing face (see FIGS. 8 and 10), and integral raised areas 7*d* and 9*d* on its other face (see FIGS. 8 and 9). Areas 7*d* and 9*d* correspond in outline to and are at least approximately in register with areas 7*c* and 9*c*. The faces of areas 7*d* and 9*d* are offset from the back face of plate 35 by an amount equal to the thickness of the stencil sheet 25, and the amount of this offset may be made as desired by using a stencil sheet of appropriate thickness. When the plate 35 is used on the printing cylinder of a printing press, for example, raised areas 7*d* and 9*d* effect impression of ink on the work over areas 7*c* and 9*c* at higher pressure than over areas 11*c* and 13*c* (the latter not being backed by any raised areas). The differentiation in pressure may be accurately controlled in amount by suitable preselection of the thickness of the stencil sheet to determine the thickness of raised areas 7*d* and 9*d* and is accurately controlled as to location as will be evident.

It will be understood that a rubber printing plate may be made in accordance with the invention with raised areas of different thickness on the back of the plate by using a plurality of appropriate stencil sheets of different thickness to provide the desired differentiation in thickness of the raised areas. In this manner, variable pressure may be obtained on different printing areas of the same plate for proper impression of all the printing areas.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A made ready printing plate of an elastomeric material having a printing face and a generally flat back face, the printing face having a printing pattern in relief with all printing areas in the finished plate being of substantially the same relief, the printing pattern comprising first and second printing areas, the first printing area being relatively large and the second printing area being relatively small, the back face of the plate having an integral area in relief corresponding generally in outline to and approximately registering with said first relatively large printing area on the printing face, the area on the back face corresponding to and registering with the second relatively small printing area being generally flat with the remainder of said back face.

2. A made ready printing plate of an elastomeric material having a printing face and a generally flat back face, the printing face having a printing pattern in relief with all printing areas in the finished plate being of substantially the same relief, the printing pattern comprising relatively large printing areas and relatively small printing areas, the back face of the plate having integral areas in relief corresponding generally in outline to and approximately registering with said large printing areas on the printing face, the areas on the back face corresponding to and registering with the small printing areas being generally flat with the remainder of said back face.

References Cited by the Examiner

UNITED STATES PATENTS

| | | | |
|---|---|---|---|
| 952,312 | 3/10 | Droitcour | 101—401.3 |
| 1,219,472 | 3/17 | Martinsen | 101—401.3 |
| 1,852,115 | 4/32 | Haggerty et al. | 101—401.3 |
| 2,088,399 | 7/37 | Gibson | 101—401.3 |
| 2,863,000 | 12/58 | Hell | 101—426 |

OTHER REFERENCES

Apps: Printing Ink Technology. Leonard Hill Limited, London, 1st ed., pub. 1958. TP49A6C.3 (page 391).

Flexography: Principles and Practices, Flexographic Technical Association, Inc., copyright 1962. Z 244F5 (pages 16, 48–49).

DAVID KLEIN, *Primary Examiner.*

WILLIAM B. PENN, *Examiner.*